Sept. 2, 1958 M. HUFF 2,849,835
METHOD FOR SOILLESS CULTIVATION USING GIBBERELLIC ACID
Filed Dec. 7, 1956 2 Sheets-Sheet 1
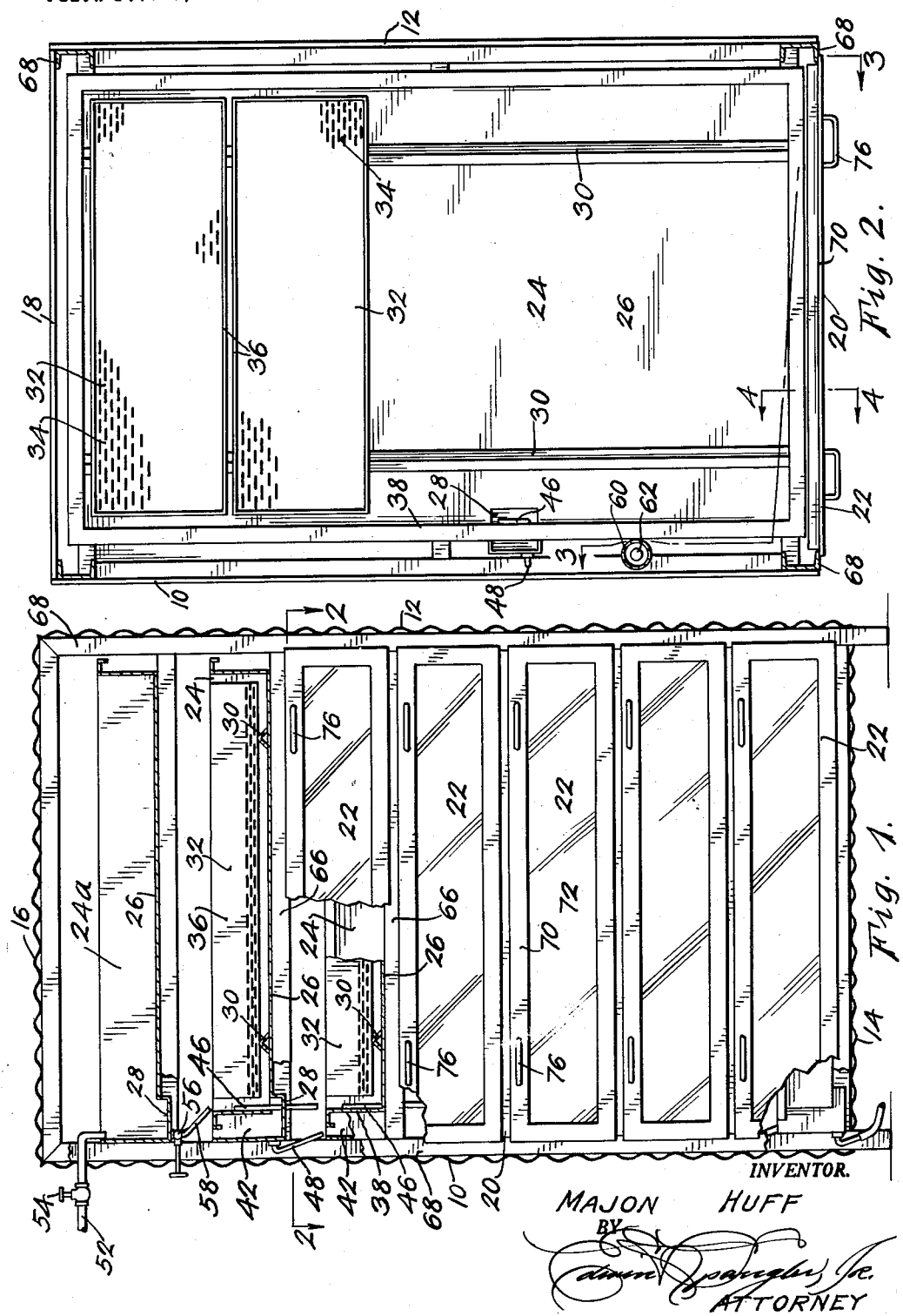
INVENTOR.
MAJON HUFF
BY
ATTORNEY Sept. 2, 1958 M. HUFF 2,849,835
METHOD FOR SOILLESS CULTIVATION USING GIBBERELLIC ACID
Filed Dec. 7, 1956 2 Sheets-Sheet 2

INVENTOR.
MAJON HUFF
BY
ATTORNEY

United States Patent Office 2,849,835
Patented Sept. 2, 1958

2,849,835

METHOD FOR SOILLESS CULTIVATION USING GIBBERELLIC ACID

Majon Huff, Denver, Colo., assignor to Colorado Serum Company, Denver, Colo., a corporation of Colorado Application December 7, 1956, Serial No. 626,888

2 Claims. (Cl. 47—1.2)

This invention relates to soilless cultivation; and more particularly, to a soilless cultivator and the method of growing plants therein, using gibberellic acid.

For nearly a hundred years the art of soilless cultivation has been practiced with varying degrees of success; however, it is only recently that methods and machines for soilless cultivation have been developed which are economically practical for use in growing fresh green animal feed, flowers and vegetables. These machines were first developed and used in Europe and have only recently enjoyed any measure of success in the United States. Generally speaking, when feed is grown in these machines it is used as a dietary supplement to the regular feed and the combination thereof has proven highly beneficial to the stock.

At the present stage of development of methods for soilless cultivation of plants, perhaps the single most important objective is to grow the plants as rapidly as possible so that the ratio of pounds of seed per pound of plants will be at a high level on the day of harvest without sacrificing the nutritional values so important to the stock.

The most popular of the prior art soilless feed growing machines and methods utilizes a six-day growth cycle which produces feed approximately six inches high during this period. New seed is added each day to replace that which has matured and is harvested. It has been found, however, that the most rapid growth takes place during the last four days of the cycle and that very little growth takes place during the first two days during which the seed is germinating and beginning to sprout. Thus, full growth of the seed is not achieved in the six-day period but is attained by the prior art methods on about the eighth or ninth day. Of course, a soilless cultivation machine with eight or nine, rather than six, stages to accomplish full growth of the feed is considerably more expensive and is difficult to justify economically.

Also, the machine can be operated more economically and the plants produced will cost less per pound if the amount of seed required per pound of plants is reduced. Further savings can be realized through the most efficient use of soluble fertilizers and the careful selection of the most beneficial types.

It has now been found in accordance with the present invention that the seed will mature completely within the machine and attain a height of nearly eight inches in only six days if subjected to a novel two or three-day preliminary treatment outside the machine which causes the seeds to sprout and enables them to take full advantage of the controlled rapid-growth conditions existing inside the machine. Also, the novel preliminary conditioning process of the present invention includes a step that prevents the seed from moulding in the warm humid atmosphere inside the machine which is one serious disadvantage of the prior art soilless cultivation devices and methods.

It is, therefore, the principal object of the present invention to provide an improved method for soilless cultivation of plants.

A second object of the invention is to provide a novel preliminary treatment for the seed to produce more rapid and complete growth thereof during the normal six-day growth cycle inside the machine.

A third object of the invention is to provide a new method of pre-terating seed for use in soilless cultivation that includes a step which prevents the seed from moulding.

Another object of the invention is to provide a method for soilless growth of plants that produces a substantial increase in the yield of plants per pound of seed.

A further object of the invention is the provision of an improved and simplified soilless plant-growing machine.

Other objects will be in part apparent and in part pointed out specifically hereinafter in connection with the description of the drawing that follows, in which:

Figure 1 is a front elevation of the soilless plant-growing machine of the present invention, portions of which have been broken away to show the construction of the trays, siphons, inlet and drain;

Figure 2 is a section taken along line 2—2 of Figure 1;

Figure 2 is a fragmentary section taken along line 3—3 of Figure 2, portions of the heater having been broken away to expose the interior thereof;

Figure 3:
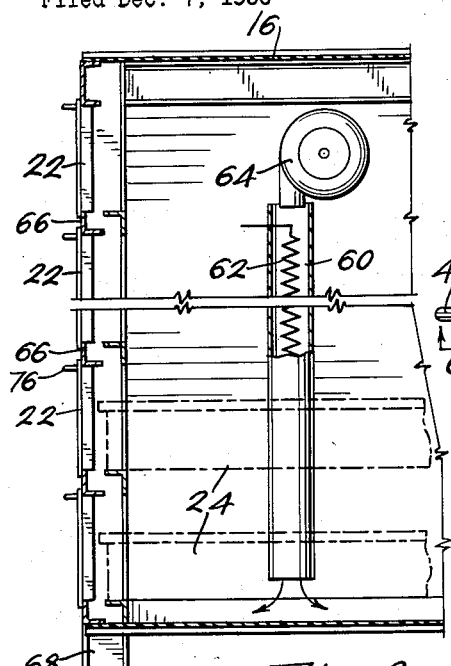

In the detailed description of the drawing that follows, the soilless cultivator and method of use thereof will be specifically referred to in connection with the growth of stock feed which is one of the principal uses of the apparatus and method; however, it is to be understood that both the machine and method can also be used in the soilless cultivation of other plants such as flowers and vegetables. Referring now to the drawing illustrating the machine or apparatus in which the main growth of the feed takes place, it will be seen to comprise an enclosed cabinet having sides 10 and 12, a bottom 14, a top 16, a back 18, and a front 20 provided with a plurality of removable doors 22 that give access to the interior thereof. The interior of the cabinet is divided into a plurality of superimposed sections, preferably seven, by spaced parallel partitions or trays 24 which have bottoms 26 that slope toward cup-like depressions 28 adjacent wall 10 that are arranged in substantially vertical alignment. Angle irons 30 are placed in the bottom of each tray in spaced parallel relation extending from the front to rear of the cabinet and provide means for supporting five seed baskets 32 within each of the lower six sections. The seventh tray 24a at the top of the cabinet does not contain any baskets but forms a reservoir in which the liquid fertilizer used to irrigate the growing feed is mixed and stored.

Figure 6:
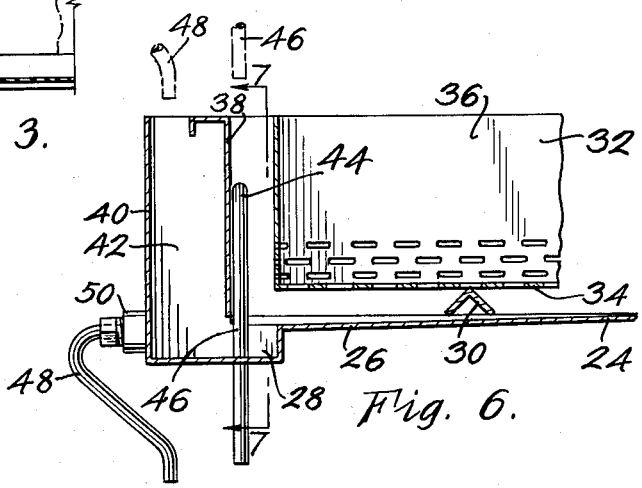
Figure 6 is a section taken along line 6—6 of Figure 5 showing a basket in place on the pan.

In connection with Figures 1, 2 and 6 it will be seen that each of the baskets 32 is provided with a perforated bottom 34 and the sides 36 are also perforated along the lower edges thereof. These perforations in the basket admit the liquid fertilizer to the seeds within the basket as said solution passes successively from tray to tray in a manner which will be described presently. Also, the perforations allow the solution to drain from the seeds and basket and permits the roots of the growing feed to grow out through the sides and bottom thereof. Obviously, the number of baskets per tray is not of any particular significance except for the fact that five separate baskets for each tray enable the trays to be made of convenient size for handling. The baskets are arranged in transversely extending parallel relation as shown in Figure 2 and are inserted and removed one at a time from the front of the cabinet. The angle irons 30 support the baskets in spaced relation to the bottom of the trays and permit the roots of the feed to grow freely out through the perforations in the bottom of the baskets.

Figure 5:
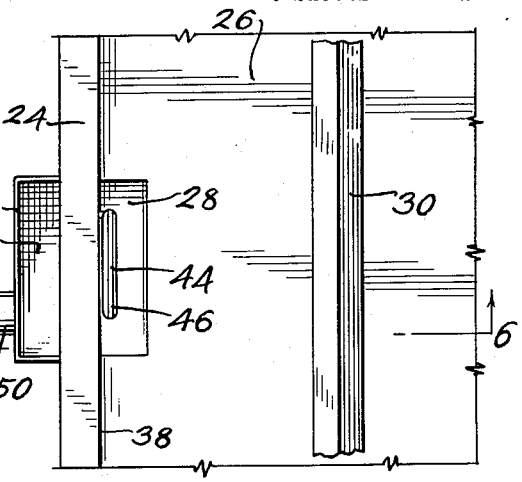
Figure 5 is an enlarged fragmentary plan view showing one of the pans or stages and the siphon associated therewith for irrigating the plants and draining the fertilizer solution.
Figure 7:
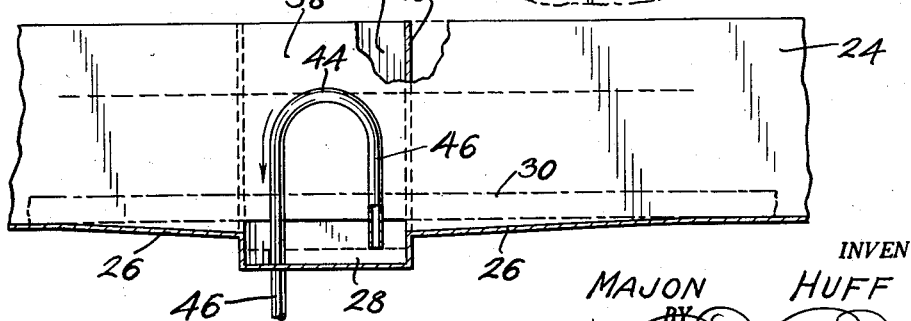
Figure 7 is a section taken along line 7—7 of Figure 6.

Referring to Figures 5, 6 and 7, it will be seen that the side wall 38 of the trays terminate short of the bottom of the cup-like depressions 28. A secondary wall 40 joins with side wall 38 and the bottom of the cup-like depression to form a receiver 42 for the liquid nutrients which drain from the feed after it has been irrigated. The irrigating solution enters the tray from siphon tube 46 of the tray immediately above and fills the tray to the level of U-bend 44 in the siphon tube as indicated by the dotted line in Figure 7. This liquid level thoroughly soaks and irrigates the seed and feed in the baskets on the trays. The tray fills with the irrigating solution to the level of the U-bend 44 of the siphon; whereupon, the siphon functions to drain the tray and transfer the solution to the tray immediately underneath. Drainage of the irrigating solution from the feed baskets is carried off through tube 48 that passes from fitting 50 in secondary wall 40 to the receiver 42 in the tray immediately underneath and is finally discharged as waste.

Figure 1 shows water supply line 52 equipped with valve 54 connected through wall 10 of the cabinet and into the reservoir 24a. The reservoir is filled and the soluble chemical fertilizer dissolved therein preparatory to each irrigation operation. Thereafter, valve 56 in outlet line 58 of the reservoir is opened to drain the solution from said reservoir into the next lower tray. No siphon is necessary in the reservoir. Each of the six lower trays then fills successively from top to bottom until all the feed and seed in the six growth stages of the cabinet is thoroughly irrigated; whereupon, the solution is discarded from the lowest tray through tube 46.

Figure 4:
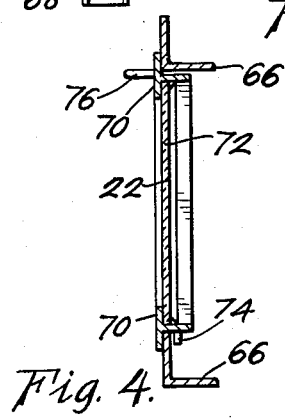
Figure 4 is an enlarged fragmentary section taken along line 4—4 of Figure 2 showing the door construction.

Figures 2 and 4 illustrate the thermostatically-controlled electric heater 60 of a conventional type that is used to maintain a relatively uniform temperature within the cabinet of between approximately 75° F. and 80° F. The heating element 62 has been shown schematically as a simple electrical resistance unit and it is encased in a tubular housing 64 extending from the top to the bottom of the cabinet between wall 10 and the adjacent wall 38 of the trays. The thermostat is conventional and has not been shown. A blower 66 is mounted at the upper end of tube 64 and acts to circulate the heated air throughout the cabinet. The relative humidity inside the cabinet is preferably maintained between 75 and 80% by circulating the heated air through the reservoir section with it filled with water.

Now, in Figures 1 through 4, the front 20 of the cabinet will be seen to include a plurality of spaced transverse frame members 66, in the form of angle irons as shown, that support the doors 22 and extend between the upright frame members 68 at the corners. The doors 22 include a T-iron frame 70 with transparent panels 72 therein. Lugs 74 on the lower edges of the frame engage the upright web of the angle irons and hold the doors in place. Handles 76 provide means for removing the doors to insert the seed and remove the fully grown feed.

Having thus pointed out the structural features of the machine and its mode of use, the novel method by which the feed is grown in said machine will now be described. As already mentioned, the first two or three days of the widely used six-day growing cycle of the prior art methods are spent in getting the seed to germinate and sprout which prevents the feed from attaining maturity during the remaining three or four days in the machine. It has now been found, however, in accordance with the present invention, that a simple two- or three-day preliminary treatment of the seed outside the machine will cause it to sprout so that a full six days of rapid growth can be accomplished inside the machine thus enabling the feed to reach maturity before being harvested. As in the prior art soilless cultivation methods and machines any of the common grains such as wheat, oats, rye, maize and barley may be used. In the first step of the preliminary conditioning of the seed, about twenty-five pounds thereof (five pounds per basket for a single stage or tray) is placed in a burlap sack and immersed in water for not more than one day, twelve hours having been found to be sufficient. The water is preferably maintained around room temperature for best results. The seed becomes thoroughly soaked during this immersion period, swells or puffs to a considerable extent, and sometimes begins to germinate. The second step of the preliminary treatment which follows the one-day immersion or soaking is a one- to two-day air-drying operation during which the grain drains, dries and sprouts preparatory to being placed in the soilless cultivation apparatus already described. The final pre-treatment step is a short ten-minute immersion of the seed in a weak solution of sodium hypochlorite to kill the mould bacteria and prevent the seed from moulding in the warm humid atmosphere of the cultivation machine. One of the principal objections of the prior art soilless cultivation methods is the strong tendency for the seed to mould in the controlled climate inside the machine. It has now been found, however, that a brief soaking of the seed in a week solution of sodium hypochlorite eliminates this problem entirely. A concentration of about one ounce of sodium hypochlorite to four gallons of water with a soaking time of approximately ten minutes has been found quite satisfactory.

At this point a further improvement in the pre-treatment of the grain should be noted. Excellent results have been attained by treating the seed in the initial step with a very weak solution of gibberellic acid ($C_{19}H_{22}O_6$) instead of plain water. The gibberellic acid causes the seed to germinate more rapidly and much more completely than water alone and results in a considerably increased yield of feed per pound of seed. A concentration of one mg. of gibberellic acid or the equivalent thereof per 5000 grams of water has proven quite satisfactory. As an example of the greatly increased bulk of the seed, due to the rapid and more complete germination thereof when treated with gibberellic acid versus that treated with water alone, five pounds of seed will cover the bottom of a basket to a depth of about one and one-half inch with only a water-soaking; however, when treated with a gibberellic acid solution an equivalent weight of seed will fill a basket to a uniform depth of three inches. Also, the yield of feed per pound of grain increases nearly 50% with the gibberellic acid treatment compared with that of water. Under ideal conditions the prior art soilless cultivation methods have been able to produce a maximum of approximately five pounds of feed per pound of seed during a six-day controlled growing cycle. The same grain under the same growth conditions will increase in yield up to six pounds of feed per pound of grain during a six-day cycle in the machine if the seed is subjected to a two- to three-day preliminary treatment in accordance with the three-step method described above using water as a soaking medium. This yield is further increased to over eight pounds of feed per pound of seed if the grain is pre-treated using a weak gibberellic acid solution. Thus it can be seen that the pre-conditioning of the grain which forms the most important feature of the instant soilless cultivation method is responsible for a greatly increased yield with a resultant decrease in cost per pound of feed.

Following pre-treatment of the seed, five pounds thereof is placed in each of the five trays of the stage that has just been harvested, the remaining stages, of course, containing feed that has been growing in the machine from one to five days. The final step in the method is that of irrigating the feed in all stages of growth once in each 24-hour period. The fertilizing solution that has been found most satisfactory contains about two ounces of free nitrogen in fifty gallons of solution in the reservoir. The nitrogen is preferably in the form of ammonium nitrate. The fertilizing solution is passed successively down through the six growth stages of the machine in the manner already described.

From the foregoing description of the several useful and novel features of the soilless cultivation machine and method of the present invention it will be seen that the several useful objects for which they were developed have been achieved.

Although the invention has been described in connection with the specific apparatus and methods described in the instant application, I realize that certain modifications may be made therein by those skilled in the art without departing from the true scope thereof; hence it is my intention that the measure of protection afforded hereby shall be limited only insofar as said limitations are expressly set forth in the appended claims.

What is claimed is:

1. A method of growing feed from seeds without soil which comprises the steps of: soaking the seeds in a weak solution of gibberellic acid, draining the soaked seeds, treating the drained seeds with a weak hypochlorite solution, and irrigating the seeds at daily intervals with a liquid fertilizer solution.

2. A method of pre-treating seeds for use in soilless cultivation which comprises the steps of: soaking the seed for a day in a solution containing one part gibberellic acid in five million parts water, draining the seed for at least one day, and soaking the seed for approximately ten minutes in a solution containing approximately one ounce of sodium hypochlorite for each four gallons of water.

References Cited in the file of this patent

FOREIGN PATENTS 163,369    Australia _____ June 17, 1955

OTHER REFERENCES

Yabuta et al.: "Biochemical Studies on Bakanae Fungus. Part 15. Effect of Gibberellin and Heteroauxin on Rice Seedlings (1)." Published November 21, 1943, in Journal of Agricultural Chemical Society of Japan, vol. 19, No. 4, pages 244 through 248.

Duggar: "Seed Disinfection for Pure Culture Work: The Use of Hypochlorites," published 1919 in Annals of Missouri Botanical Garden, vol. 6, pages 159 through 170.

Brian et al.: "The Plant—Growth-Promoting Properties of Gibberellic Acid . . . ," published December 1954 in Journal of The Science of Food and Agriculture (by Society of Chemical Industry, London, England), vol. 5, pages 602 through 612.